Oct. 13, 1970  W. E. ENGELHARD  3,533,292
PYROMETER
Filed May 14, 1968
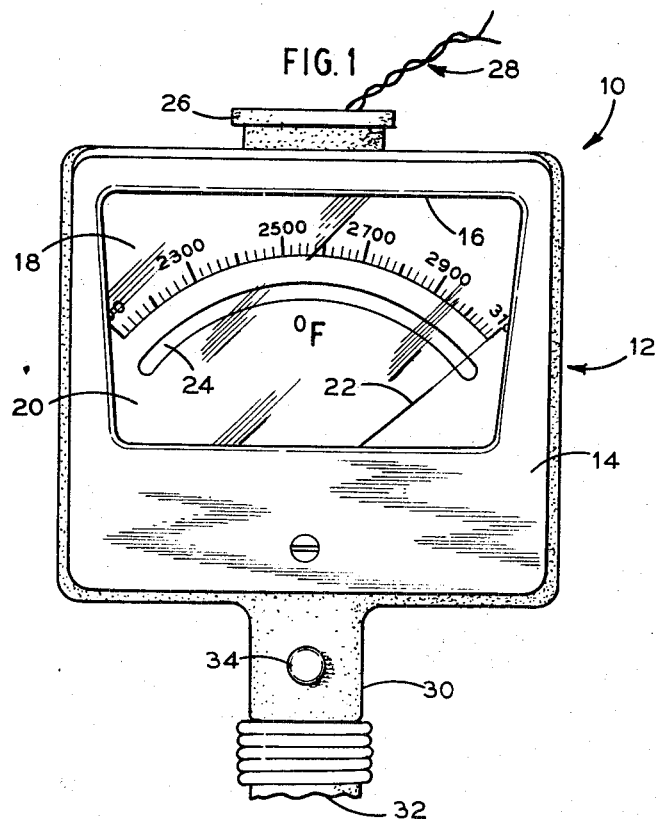
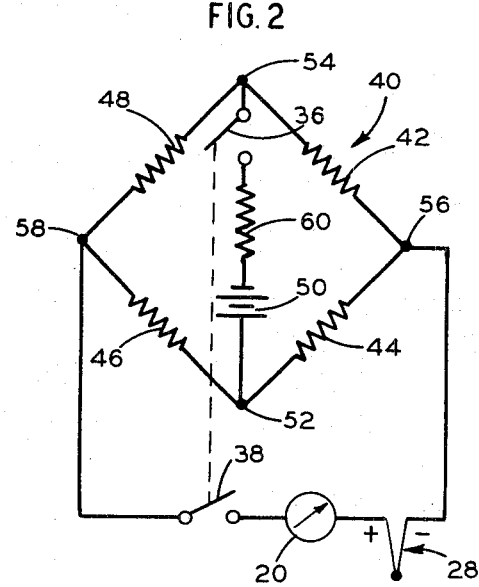
INVENTOR.
William E. Engelhard
BY
Sommers & Sommers
ATTORNEYS

United States Patent Office 3,533,292
Patented Oct. 13, 1970

3,533,292
PYROMETER
William E. Engelhard, Apalachin, N.Y., assignor to Pyro-Serv Instruments, Inc., North Arlington, N.J., a corporation of New Jersey
Filed May 14, 1968, Ser. No. 729,038
Int. Cl. G01k 5/52
U.S. Cl. 73—359    4 Claims

ABSTRACT OF THE DISCLOSURE

A pyrometer including a thermocouple connected to a meter for indicating the temperature of the thermocouple. The thermocouple is adapted to produce a signal having a predetermined level corresponding to full scale deflection of the meter. Connected in opposition to said thermocouple is a control circuit having an output potential equal to said predetermined level. Accordingly, as the temperature of the thermocouple decreases the meter reads down scale to provide a pyrometer which produces accurate readings at high temperatures even though the resistance of the thermocouple is relatively high and has a high temperature coefficient of resistance.

---

This invention relates generally to a pyrometer construction and, more particularly, pertains to an efficient and accurate portable pyrometer.

Portable hand-held pyrometers utilizing base metal thermocouples such as chromel-alumel have been used in the past for measuring temperatures up to approximately 2200° F., the practical upper limit for such a sensor. The ability to use such thermocouples in hand-held devices is due, in large part, to the fact that the alloys have a relatively low resistance and low temperature coefficient and high output potential at the upper temperature limit. However, a problem is presented when it is desired to measure temperatures in the 3000° F. range by means of a portable hand-held instrument.

To be more specific, a platinum-platinum-rhodium thermocouple, which can withstand these higher temperatures, exhibit a high resistance and relatively low output potential at these elevated temperatures plus high temperature coefficient of resistance. Thus, compensation in the form of a potentiometer circuit incorporating either manual or auomatic balancing have been required to obtain accurate readings, particularly in the high resistance range of the noble metal thermocouple. Such circuits are obviously unsuitable for portable pyrometers of the type contemplated.

Accordingly, an object of the present invention is to provide a hand-held pyrometer for use at relatively high temperatures which is highly accurate and simple to operate.

Another object of this invention is to provide a portable pyrometer which is direct reading.

A further object and feature of the present invention resides in the novel details of construction which provide a portable pyrometer of the type described which is rugged and dependable and which is substantially independent of the thermocouple resistance at elevated temperatures.

Another object of the invention is the provision of a hand-held pyrometer which is economic to produce and easy to service.

Accordingly, a pyrometer is provided which includes thermocouple means for producing a signal proportional to the temperature of an object to be measured. The thermocouple means produces a signal having a predetermined level at a preselected temperature. Control means having an output potential that is equal to said predetermined signal level is connected in opposition to said thermocouple means. Meter means is provided which is responsive to the resultant signal of said thermocouple means signal and said control means to indicate the temperature of the object thereby to provide a simple and dependable instrument.

Other features and advantages of the present invention will become more apparent from a consideration of the following detailed description when taken in conjunction with the accompanying drawing, in which:

FIG. 1 is a front elevational view, with parts broken away, of a hand-held pyrometer constructed according to the present invention; and FIG. 2 is a schematic circuit wiring diagram thereof.

As shown in FIG. 1, the pyrometer of the present invention, which is designated generally by the reference numeral 10, includes a housing or casing 12 having a front wall 14. Provided in the front wall 14 is an opening 16 through which a scale 18 of a meter 20 is visible. In other words, the meter 20 is received within the housing 12 (along with the circuit components shown in FIG. 2 and described below). The meter 20 is of the type which includes a needle 22 that normally produces a full scale reading and which moves down scale as current flow increases through the meter coils.

As shown in FIG. 1, the scale 18 is non-uniform over the temperature range. That is, equal temperature increments (of 20° F.) are spaced further apart at the low end of the scale than at the high end for reasons which will become apparent from the description below. Moreover, the meter 20 includes an accurate mirror 24 so that accurate readings may be obtained in the conventional manner.

Received in the top wall of the housing 12 is a top opening which threadedly receives a bushing 26 therein. A thermocouple 28 extends through the bushing. The housing 12 further includes a depending portion 30 to which a handle 32 is attached so that the pyrometer 10 may be held in one hand. Slidably received through an appropriate bore in the portion 30 is a push-button 34 which is adapted to close a pair of normally open switches 36 and 38 when it is depressed. The push-button 34 is normally biased outwardly by appropriate biasing means, such as a spring or the like. Additionally, the button 34 is positioned to be operated easily by the thumb so that the instrument may be held and operated by a single hand.

The thermocouple 28 contemplated for use in the present device should be able to produce a measurable output signal in the temperature range under consideration (i.e., around 3000° F.). Thus, although a thermocouple (or sensor) comprised of platinum and platinum rhodium is described, it is to be noted that this is by way of example only and is not to be interpreted as being a limitation on the present invention. That is, any thermocouple having the desired characteristics may be used.

In practice, it is found that platinum-platinum rhodium thermocouples have a relatively low potentional output, high temperature coefficient of resistance and high initial resistance. Therefore, the total resistance at elevated temperatures is relatively high whereas the output potential is relatively low. Accordingly, means are provided to produce a null point at the maximum temperature reading, thereby rendering the pyrometer insensitive to the resistance of the thermocouple at this point.

Accordingly, a control circuit or means in the form of a bridge circuit designated generally by the reference numeral 40 is provided (FIG. 2). As is conventional the bridge includes four arms, each of which includes an impedance 42–48, and two diagonals. Connected across one diagonal is a source of potential 50 and connected across the other diagonal is the meter 20 and the thermocouple 28. The values of the source 50 and the impedances 42–48 are chosen so that the output potential of the bridge 40 will be equal and opposite in polarity to the thermocouple signal at the maximum temperature reading. Hence, since the needle 22 normally points to the maximum temperature when there is no current, the meter 20 will indicate the correct temperature.

More specifically, the bridge 40 includes a pair of input terminals 52, 54 and a pair of output terminals 56, 58. Connected between the terminals 56, 58 and 54 are the respective impedances 42 and 48. Connected between the terminals 56, 58 and the terminal 52 are the respective impedances 44 and 46. Connected across the input terminals 52, 54 is a series circuit comprising source or battery 50, an impedance 60 and the normally open switch 36. Connected across the output terminals 56, 58 is a series circuit comprising the thermocouple 28 (which has the polarity indicated), the meter 20, and the normally open switch 38.

As noted above, the impedances 42–48 and 60 and the battery 50 are sized to produce a potential between output terminals 56, 58 which is equal and opposite to the signal produced by the thermocouple at the maximum scale temperature. As an example, the elements may have the following values:

Impedance:
- 60 _____ohms__ 10
- 42 _____do____ 1
- 44 _____do____ 6800
- 46 _____do____ 34
- 48 _____do____ 0.5

Battery 50 _____volts on open circuit__ 1.34

In operation, the thermocouple 28 is inserted into the object to be measured or otherwise put into intimate contact with the object. The handle 32 is grasped by the operator and the pyrometer is positioned so that the scale 18 can be read. The push-button 34 is depressed thereby closing the switches 36 and 38 to connect the meter 20 with the thermocouple 28 and the battery 50. If the temperature of the object corresponds to the maximum temperature reading on the scale 18, a null will be produced, in the manner indicated above, and the needle 22 remains pointing at the maximum temperature.

However, if the temperature of the object is less than maximum the thermocouple 28 produces a reduced amplitude signal. Accordingly, a resultant signal equal to the difference between the thermocouple signal and the potential appearing between terminals 56, 58 is applied to the meter 20 causing the needle 18 to move down scale to indicate the new temperature in response to the increased current flow.

It is to be noted that for lower temperatures the resistance of the thermocouple under consideration decreases. Translated into meter movement, this factor means that the needle 22 travels greater distances for equal temperature increments. Hence, as noted above, graduations of the scale 18 are wider at the low end thereby allowing more accurate readings.

Additionally, it is to be noted that by reading down scale the lowest temperature need not be zero. Hence the scale 18 need only show the temeprature range under consideration thereby allowing the operator to read the temperatue more accurately.

When the operator has read the temperature of the object, he releases the push-button 34 thereby opening switches 36, 38. This action disconnects the battery 50 and thermocouple 28 from the meter 20. The thermocouple 28 then may be removed from the object.

Accordingly, a portable hand-held pyrometer has been disclosed which is rugged and dependable, that can be used to measure high temperatures without the necessity of manual or automatic balancing, and which can be read in relatively small temperature increments.

While a preferred embodiment of the invention has been shown and described, it will become obvious that numerous omissions, changes and additions may be made in such embodiment without departing from the spirit and scope of the present invention.

What is claimed is:

1. A pyrometer including thermocouple means having a relatively low signal output which varies with temperature, a high initial resistance, and a high positive temperature coefficient of resistance; said thermocouple means being adapted to produce a signal having a predetermined level at a preselected temperature; control means connected in opposition to said thermocouple means and having an output potential equal to said predetermined level; said control means including a pair of input terminals and a pair of output terminals, a source of potential connected between said pair of input terminals, said thermocouple means being connected between said pair of output terminals, and impedance means connected between said pairs of input and output terminals in a bridge circuit, said source of potential and said impedance means being proportioned to produce a potential equal and opposite to said predetermined level throughout the measuring range of said pyrometer; and meter means connected in series with said thermocouple means responsive to the resultant signal produced by said thermocouple and control means for indicating the temperature of said thermocouple means, said meter means including a needle movable over a temperature scale wherein said preselected temperature corresponds to the maximum temperature reading of said scale so as to null the current through said thermocouple at said maximum temperature, thereby eliminating the effects of said high temperature coefficient of resistance at said maximum temperature and minimizing the effects of said temperature coefficient of resistance at the range of instrument use.

2. A pyrometer as in claim 1, and switch means selectively operable to connect and disconnect said thermocouple means and said source of potential with said meter means.

3. A pyrometer as in claim 1, and a housing adapted to receive therein said thermocouple means and said meter means, and a handle connected to said housing to facilitate handling of said pyrometer.

4. Apparatus according to claim 1 wherein said preselected temperature is greater than 2200° F.

References Cited

UNITED STATES PATENTS

| | | | |
|---|---|---|---|
| 2,769,340 | 11/1956 | Bernreuter et al. | 73—361 |
| 3,085,436 | 4/1963 | Huddleston | 73—361 |
| 3,225,597 | 12/1965 | Englehard | 73—361 |
| 3,280,630 | 10/1966 | Latham | 73—361 |
| 3,347,099 | 10/1967 | Schraeder | 73—359 |
| 1,209,372 | 12/1916 | Wunch | 73—360 |
| 2,154,065 | 4/1939 | Davis et al. | 73—360 XR |
| 2,929,054 | 3/1960 | Golden et al. | 73—361 XR |

LOUIS R. PRINCE, Primary Examiner

FREDERICK SHOON, Assistant Examiner